(12) United States Patent
Gupta et al.

(10) Patent No.: US 10,503,699 B2
(45) Date of Patent: Dec. 10, 2019

(54) METADATA SYNCHRONIZATION IN A DISTRUBUTED DATABASE

(71) Applicant: SAP SE, Walldorf (DE)

(72) Inventors: Gaurav Kumar Gupta, Pune (IN); Souvik Pal, Pune (IN); Amit Pathak, Pune (IN); Jay Sudrik, Pune (IN)

(73) Assignee: SAP SE, Walldorf (DE)

( * ) Notice: Subject to any disclaimer, the term of this patent is extended or adjusted under 35 U.S.C. 154(b) by 374 days.

(21) Appl. No.: 15/137,648

(22) Filed: Apr. 25, 2016

(65) Prior Publication Data

US 2017/0308547 A1    Oct. 26, 2017

(51) Int. Cl.
*G06F 16/178* (2019.01)
*G06F 16/182* (2019.01)
*G06F 16/27* (2019.01)

(52) U.S. Cl.
CPC .......... *G06F 16/178* (2019.01); *G06F 16/182* (2019.01); *G06F 16/27* (2019.01)

(58) Field of Classification Search
CPC ............... G06F 17/30; G06F 17/30174; G06F 17/30194; G06F 17/30575; G06F 17/30362; G06F 17/30171; G06F 17/30368; G06F 17/30584; G06F 17/30581; G06F 17/30371; G06F 17/30348; G06F 17/30008; G06F 11/2082; G06F 16/27; G06F 16/275; G06F 16/278; G06F 16/182
See application file for complete search history.

(56) References Cited

U.S. PATENT DOCUMENTS

| 6,370,529 | B1 * | 4/2002 | Kruglikov ......... G06F 17/30312 |
| | | | 707/704 |
| 8,019,737 | B2 | 9/2011 | Kocsis et al. |
| 8,423,515 | B2 | 4/2013 | Vivian |

(Continued)

FOREIGN PATENT DOCUMENTS

| EP | 2738698 A2 * | 6/2014 | ....... G06F 17/30289 |
| EP | 2738698 A2 * | 6/2014 | ....... G06F 17/30289 |

OTHER PUBLICATIONS

Xian, H. et al., "Method of Metadata Synchronization in Parallel Distributed Databases," 2011 IEEE 3rd International Conference on Communication Software and Networks (ICCSN), pp. 457-461, May 27-29, 2011.

*Primary Examiner* — William Spieler
(74) *Attorney, Agent, or Firm* — Sterne, Kessler, Goldstein & Fox P.L.L.C.

(57) ABSTRACT

Disclosed herein are system, method, and computer program product embodiments for synchronizing an unsynchronized distributed database system. An embodiment operates by locking, by a second node, partitions in the second node based on first information received from, a first node responsive to execution of partition utility based on a first query received by the first node. Blocking, by the second node, a second query to a data portion of the partitions in the second node based on the first information. Locking, by the second node, second node object metadata based on second information received from the first node. Receiving, by the second node, changes to first node object metadata and applying the changes to the second node object metadata. Unlocking, by the second node, the partitions in the second node and the second node object metadata while unblocking the second query.

21 Claims, 9 Drawing Sheets

(56) References Cited

U.S. PATENT DOCUMENTS

| | | |
|---|---|---|
| 8,874,508 B1 | 10/2014 | Mittal |
| 9,043,637 B2 | 5/2015 | Saika |
| 9,424,293 B2 | 8/2016 | Qian et al. |
| 2003/0220943 A1 | 11/2003 | Curran et al. |
| 2005/0114365 A1 | 5/2005 | Tucker |
| 2009/0037416 A1* | 2/2009 | Raghavan ......... G06F 17/30362 |
| 2010/0312758 A1 | 12/2010 | Clarke et al. |
| 2014/0172790 A1 | 6/2014 | Pathak et al. |
| 2016/0350363 A1* | 12/2016 | Raja .................. G06F 17/30377 |
| 2016/0350392 A1* | 12/2016 | Rice .................. G06F 17/30339 |
| 2017/0192863 A1* | 7/2017 | Eluri .................. G06F 11/2033 |

* cited by examiner

METADATA SYNCHRONIZATION IN A DISTRUBUTED DATABASE

BACKGROUND

A typical distributed database system with a shared disk storage arrangement involves one or more servers correcting via communication network and cooperating with each other to manage a distributed database stored on a stable database storage. Additionally, the typical distributed database system must be capable of maintaining data consistency across all the servers. Users, on any server, may send queries to modify the distributed database. The typical distributed database system must be able to synchronize any modification originating from any server and present a consistent, view to all the servers. As a result, synchronization becomes a necessary function in maintaining data consistency.

Metadata are information about actual data in the distributed database which help the distributed database system find or access the actual data from the distributed database. Each server may read information from the stable database storage (shared persistent storage) and generate metadata for a particular database object. These metadata are typically stored privately on each server's memory and do not have a persistent copy on the shared persistent storage.

A user query that modifies the data can lead to modification of metadata as well. However, this process modifies the privately held copy of the metadata on the server on which the query was executed. Hence, in a typical shared disk distributed database system, it is necessary to synchronize this metadata information between all the servers so that all copies of the metadata stored locally at each server presents a consistent view of the database.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
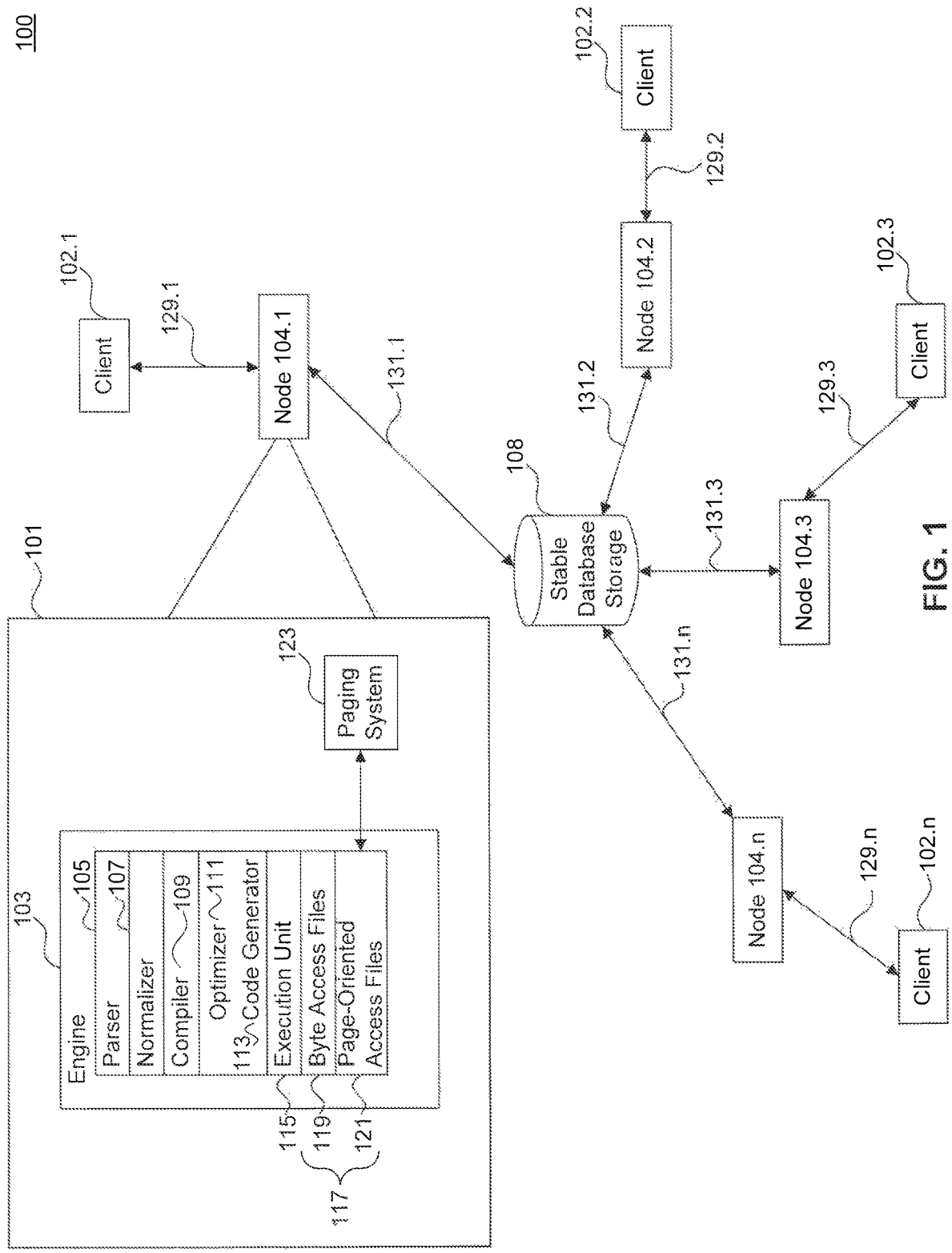
FIG. 1 is a block diagram of a distributed database system, according to an example embodiment.

Provided herein are system, method and computer program product embodiments, and combinations and sub-combinations thereof, for synchronizing an unsynchronized distributed database system.

The glossary shown below defines a list of terms used throughout the specification. These definitions are applicable to certain but not all embodiments disclosed herein. Also, these terms (pursuant to some but not all embodiments) are further discussed in other portions of the following Detailed Description. Thus, it should be understood that the following Glossary is provided for illustrative, example purposes only and are representative of certain embodiments covered herein.

Glossary

Active utility node: An active utility node is a server instance where a partition utility is currently executing.

Boot Recovery: A boot recovery is a procedure that is followed when all the instances in the cluster boots up one by one. While this recovery is in progress, no other tasks are allowed to run.

Distributed Database A distributed database system (or a shared disk cluster configuration system) is a set of two or more database servers (also known as instances), communicating via network and cooperating with each other to simultaneously manage the same set of data stored in a shared disk cluster. Specifically, in a shared disk cluster environment, all disks are accessible from all the instances which forms a database cluster.

Drop partition: One example of a partition utility, a drop partition removes all data, statistics, corresponding local indexes, partition definition related to that partition.

Failover Recovery: When a single instance in the database cluster crashes, all other active instances in the cluster nodes participate in the process and one node out of the cluster nodes is chosen to recover the tasks on the failed node. In order to expedite the recovery process, more than one node may be selected for this task. In that case, each node picks up one or more database(s) and recovers transactions of that database(s). However, recovery of tasks belonging to one database is never distributed across multiple nodes. While this recovery process is in progress, other tasks are allowed on active instances as long as they do not conflict on the database objects being recovered.

Indoubt Lock: An indoubt lock is a locked object which was held at one instance that has crashed and its status, i.e., whether the object was locked in shared or exclusive mode, whether the lock was still held or released before the crash, is not known to other instances.

Merge partition: One example of a partition utility, a merge partition combines the data from two or more merge-compatible partitions into a single partition.

Move partition: One example of a partition utility, a Trove partition moves the data and associated indexes of a partition from one segment to a specified segment. A segment denotes a logical location within a disk.

Node: A node is the same as a server instance, running a distributed database system.

Object Access Synchronization: Object access synchronization is used to maintain coherence of existing in-memory data structures across all nodes in a distributed database system. Further, it is a short duration clustered wide lock on in-memory structure to disallow changes. In particular, if one node wishes to change part of its object metadata, that node takes object access synchronization lock and pushes its changes to all of the other nodes. As soon as one node gets the object access synchronization lock, all the other nodes in the cluster assumes that the latest information is available on that node and before using the object metadata other nodes will consult with the node that has taken object access synchronization.

Object Creation Synchronization: Object creation synchronization is a cluster wide lock to disallow other nodes to initiate the object metadata. In particular, object creation synchronization is different from object access synchronization because it disallows creation of object metadata while object access synchronization disallows the change in existing object metadata.

Object Metadata: Object metadata is an in-memory structure, which stores information of an object currently represented by the object.

Partitioned Object: A partitioned object is one or more objects divided by a technique using some defined parameter. For example, an employee details table of an organization partitioned based on the city of the employee.

Partition Utility (PLM Utility): PLM or Partition Lock Management mechanism allows a task, to lock (and hence restrict others' access) only affected partitions of an object (database table, for example). This approach opens up other unaffected partitions for tasks and thus improves concurrency of the database application.

Split partition: One example of a partition utility, a split partition redistributes the data of a single partition into two or more partitions.

Truncate partition: One example of a partition utility, a truncate partition removes all the data and associated indexes from that partition, but leaves the partition definition intact.

Utilities: Correspond to one of the five partition utilities mentioned above: split, merge, move, drop, and truncate partition.

Utility node: A utility node is a server instance where a partition utility has executed and the instance is waiting for a subsequent task.

Synchronizing an Unsynchronized Distributed Database System

FIG. 1 is a block diagram of a distributed database system 100, according to an embodiment. The distributed database system 100 includes servers 104.1 through 104.$n$ (hereinafter servers 104.$n$ or nodes 104.$n$) communicating over communications link 131.1 through 131.$n$ (hereinafter communications link 131.$n$) to stable database storage 108. As shown, client devices 102.1 through 102.$n$ (hereinafter client devices 102.$n$) may comprise one or more standalone terminals connected to servers 104.$n$ over a communication network 129.1 through 129.$n$ (hereinafter communication network 129.$n$), according to an embodiment. Examples of the distributed database system 100 may be implemented in a cloud distribution system or a business communication system. Specifically, the client devices 102.$n$ connect and communicate with a Database Management System 101 ("DBMS") in servers 104.$n$ over the communication network 129.$n$, according to an embodiment. Examples of the client devices 102.$n$ may include mobile devices, standalone workstations, or personal computers (PCs). Examples of the communication network 129.$n$ and 131.$n$ may include Bluetooth, Wi-Fi, Ethernet, etc.

In operation, client device 102.$n$ may store data in, or retrieve data from, a stable database storage 108 using DBMS 101, as shown in FIG. 1. The stable database storage 108 and the DBMS 101 will be explained further below.

In an embodiment, the communication networks 129.$n$ includes functionality for packaging client calls as Structured Query Language (SQL) requests, together with any parameter information, into a format (of one or more packets) suitable for transmission to the DBMS 101. The described computer hardware and software are presented for purposes of illustrating the basic underlying desktop and server components that may be employed for implementing embodiments of the present invention. For purposes of discussion, the following description will present examples in which it will be assumed that there exist multiple server instances (e.g., database server odes) in a cluster that communicate with one or more "clients" (e.g., personal computers or mobile devices). The embodiments of the present disclosure, however, are not limited to any particular environment or device configuration. Instead, embodiments may be implemented in any type of system architecture or processing environment capable of supporting the methodologies presented herein.

Many relational databases implement a variant of SQL, which is a language allowing users and administrators to create, manipulate, and access data stored in the database. SQL statements may be divided into two categories: data manipulation language (DML), used to read and write data; and data definition language (DDL), used to describe data and maintain the database. In operation, for example, the client devices 102.$n$ may issue one or more SQL commands to the server 104.$n$ over communications network 129.$n$. SQL commands may specify, for instance, a query for retrieving particular data (i.e., data records meeting the query criteria) from the stable database storage 108. In addition to retrieving the particular data from the stable database storage 108, the client devices 102.$n$ also have the ability to issue commands to modify the stable database storage 108's structure or modify the information stored in a field/various fields. Specifically, client devices 102.$n$ may insert new rows of data records into table(s), or to update and/or delete existing records in the table(s). More detail as to how the particular data is retrieved is explained below.

SQL statements (or simply "queries") must be parsed to determine, an access plan (also known as "execution plan" or "query plan") to satisfy a given query. In operation, the SQL statements received from the client device(s) 102.$n$ (via network 129.$n$) are processed by the source database engine 103 of the DBMS 101. The source database engine 103 comprises of a parser 105, a normalizer 107, a compiler 109, an execution unit 115, and access methods 117. Specifically, the SQL statements are passed to the parser 107, which employs conventional parsing methodology (e.g., recursive descent parsing). Then, the normalizer 107 normalizes the parsed query. Normalization includes, for example, the elimination of redundant data. Additionally, the normalizer 107 performs error checking, such as confirming that table names and column names which appear in the query are valid (e.g., are available and belong together). Finally, the normalizer 107 may also look-up any referential integrity constraints, which exist and add those to the query.

After normalization, the query is passed to the compiler 109, which includes an optimizer 111 and a code generator 113. The optimizer 111 performs a cost-based analysis for formulating a query plan, that is reasonably close to an optimal plan. The code generator 113 translates the query plan into executable form for execution. The execution unit 115 executes the query plan using the access methods 117. The access methods 117 are a file system used to access files. Specifically, the access methods 117 may access files using byte access files 119 and page-oriented access files 121, according to an embodiment. In an embodiment, the byte access files 119 is a file system of access methods 115 which accesses files as a collection of bytes. In an embodiment, page-oriented access files 121 is another file system of access methods 117 which accesses files as fixed size object called page files. The page-oriented access files 121 accesses files using paging system 123, as further explained below.

Figure 2:
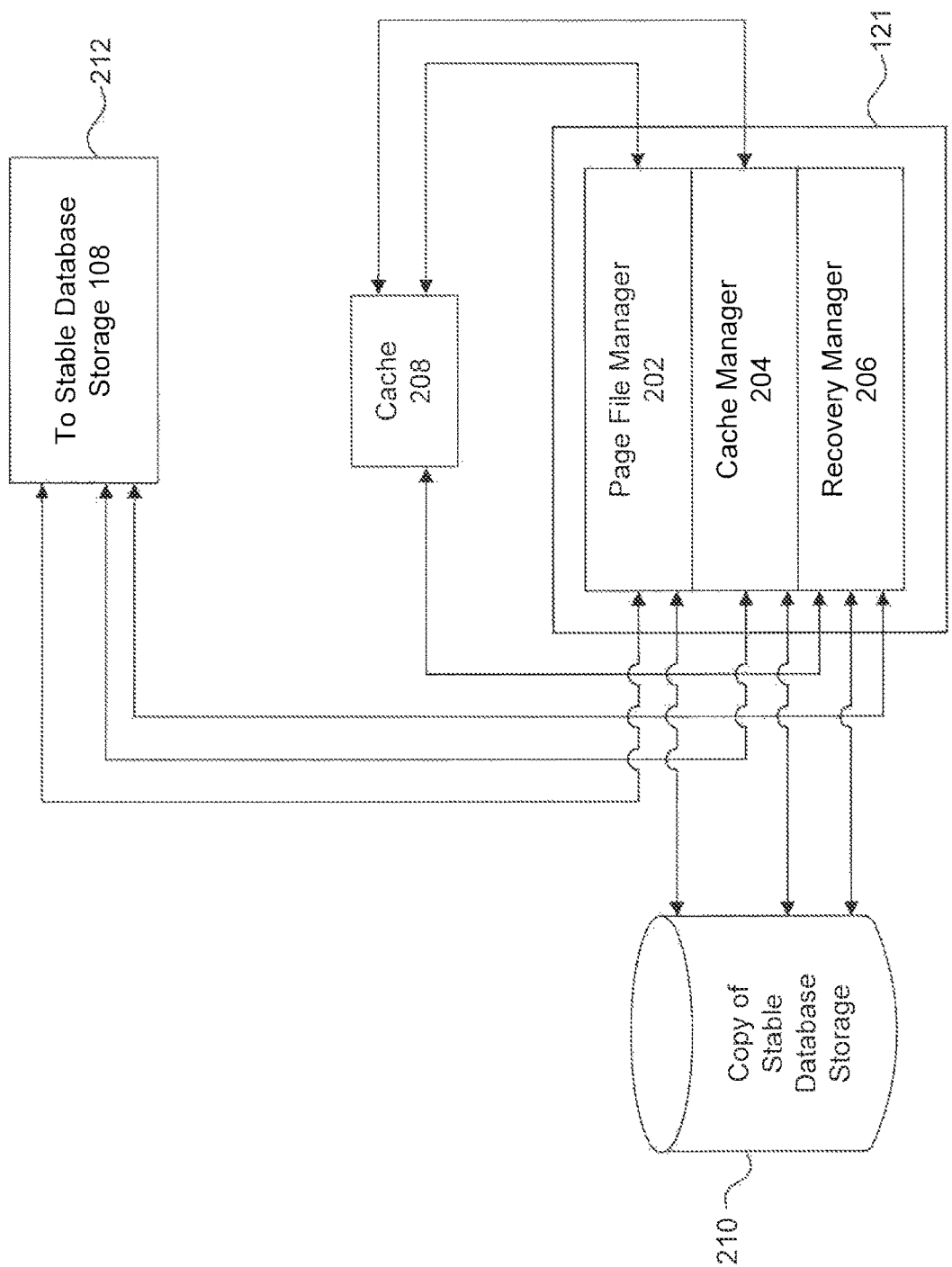
FIG. 2 is a block diagram of a page-oriented access files accessing a stable database storage, according to an example embodiment.

FIG. 2 is a block diagram of a page-oriented access files 121 accessing a stable database storage 108, according to an embodiment. The page-oriented access files 121 include page file manager 202, cache manager 204, and recovery manager 206. The paging system 123 further includes a cache 208, a copy of stable database storage 210, and a pathway 212 to communicate to stable database storage 108. On every server 104.n. their respective paging system 123 maintains a copy of stable database storage 210 to ensure optimum redundancy in the distributed database system 100. The page-oriented access files 121 receive the query plan from execution unit 115. In order for the query plan to efficiently access and manipulate data from the stable database storage 108, page file manager 202 reads portions of data from the copy of the stable database storage 210 and generates metadata as fixed size object files into cache 208, according to an embodiment. At the cache 208, the query plan manipulates the object metadata. After manipulation, the cache manager 204 flushes the newly manipulated object metadata back to the copy of the stable database storage 210 (copy of the stable persistent storage 210). The recovery manager 206 commits and instructs the DBMS 101 to make all changes in the copy of the stable database storage 210 permanent. In response, the page file manager 202 pushes the changes of the copy of the stable database storage 210 to the stable database storage 108, according to an embodiment. In order to ensure proper recovery in case of a system crash or failure, the page file manager 202 keeps track of all DBMS 101 activity, according to an embodiment.

Figure 3:
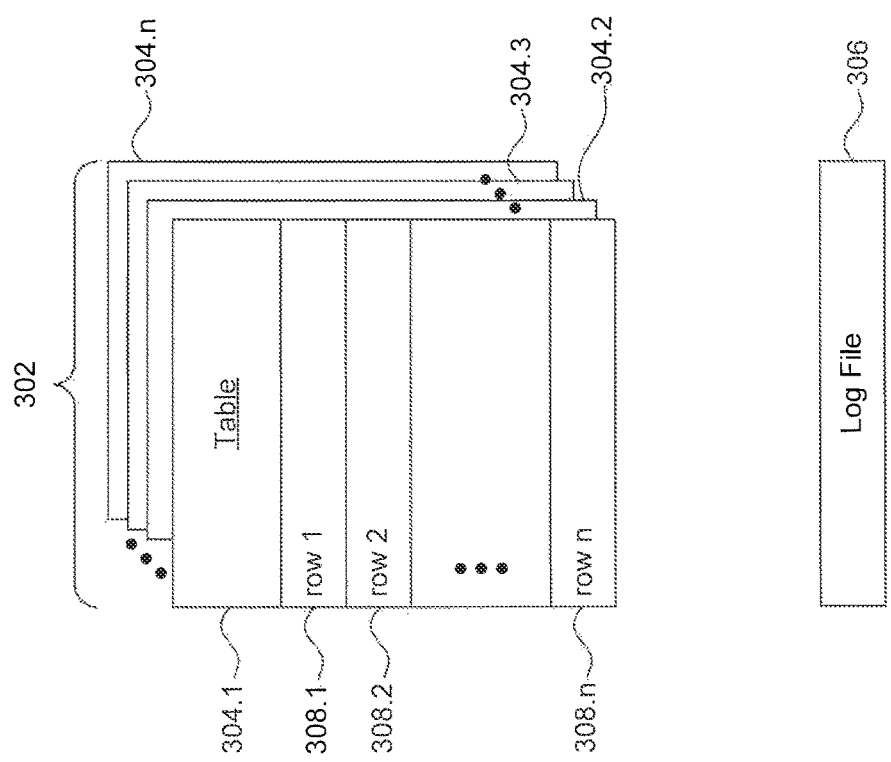
FIG. 3 is a block diagram of a distributed database, according to an example embodiment.

FIG. 3 is a block diagram of a distributed database, according to an embodiment. In particular, FIG. 3 illustrates a distributed database and an associated log file in the stable database storage 108 and the copy of the stable database storage 210, according to an embodiment. A distributed database 302 includes one or more source database tables 304.1 through 304.n (hereinafter source database tables 304.n), also called relations, and an associated log file 306. Typically, resident on the server 104.n, each source database table 304.n comprises one or more "rows" or "records" (tuples) (e.g., rows 308.1 through 308.n, as shown in FIG. 3). A typical database will include many tables, each of which stores information about a particular type of entity. A table in a typical relational database may contain anywhere from a few rows to millions of rows. A row is divided into fields; each field represents one particular attribute of the given row. A row corresponding to an employee record, for example, may include information about the employee's ID number, last name and first initial, position, date hired, social security number (SSN), and salary. Each of these categories, in turn, represents a database field. In the foregoing employee table, for example, position is one field; date hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Additionally, in order to increase performance, availability, and efficiency at the server 104.n, users may choose to partition large source database tables into smaller partitions, according to an embodiment. The users may partition the source database tables 304.n based on specific criteria designated by the DBMS 101. For example, the specific criteria may be range partitioning, list partitioning, and hash partitioning, according to example embodiments. Range partition partitions a table based on a column having row values that fall within range of a partitioning key set by the DBMS 101. List partitioning partitions a table when a row value matches a partitioning key. Hash partitioning partitions a table based on a result of a hash function. In an embodiment, any combination of the partitioning schemes mentioned above may be used.

In the distributed database system 100, the servers 104.n may store the source database table 304.n as one or more partitioned tables, according, to an embodiment.

In an embodiment, the client devices 102.n may access, modify, and/or use the distributed database 302 on the servers 104.n. As a person skilled in the art may understand, in a typical distributed database system, client devices 102.n may modify the distributed database 202 (or in memory copy) in the copy of stable database storage 210 on servers 104.n. In order to maintain data consistency in the typical distributed database system, the other servers (104.1 through 104.3) and the stable database storage 108 must know of the modifications. However, should a client request an execution of a partition utility via a query followed by a subsequent query in the node cluster may disrupt the data consistency across the distributed database system 100.

Figure 4:
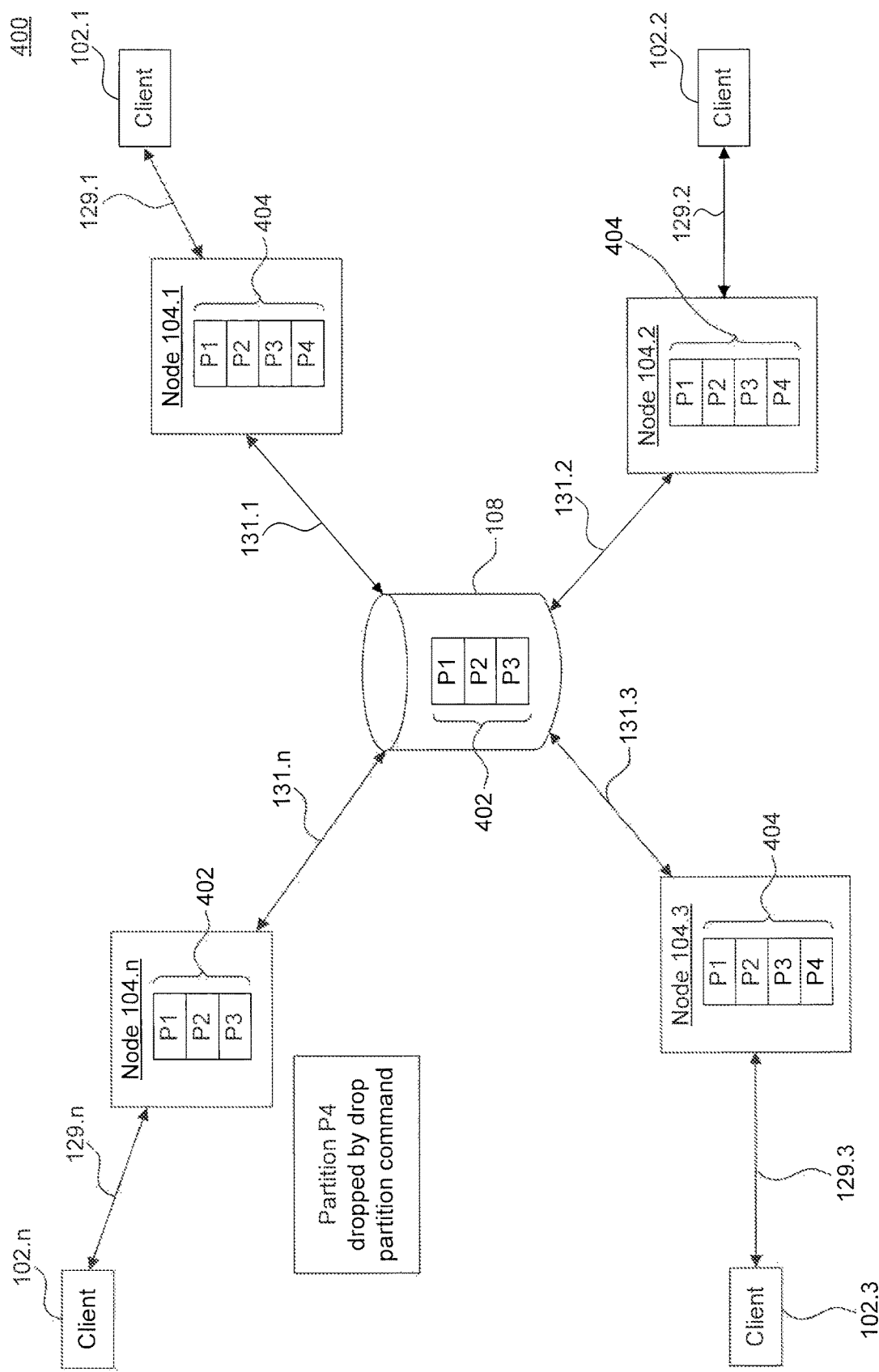
FIG. 4 is a block diagram of a distributed database system illustrating unsynchronized distributed databases, according to an example embodiment.

FIG. 4 is a block diagram of a distributed database system 400 illustrating unsynchronized distributed databases, according to an embodiment. The following will show by way of examples the nature of the problem. The system and its parts are not limited to the explanation described below.

Specifically, FIG. 4 illustrates, for example, servers 104.n and their respective source database table partitions 402 and 404. The source database tables 304 are partitioned and their associated object metadata show the source database tables 304 as having partitions 402 and 404. According to an embodiment, the source database tables 304 are split into multiple partitions—(e.g., partition one "P1," partition 2 "P2," partition 3 "P3," and partition 4 "P4"). However, server instance 104.n illustrates object metadata partition 402 showing source database table 304 with only three split partitions—(P1, P2, and P3.). Server instance 104.n received a DDL command from client device 102.n over network communications 129.n, according to an embodiment. Specifically, server instance 104.n received a DDL command such as a partition utility, according to an embodiment. In this case, the partition utility command is a drop partition command on P4. In an embodiment, the function of the partition utility command is to instruct the page file manager 202 command to lock affected partitions (P4 in the current example) of a source database table and to perform the specific utility command. By locking affected partitions of the database table, this allows other unaffected partitions (P1, P2, and P3 in the current example) for other tasks and improves concurrency of the distributed database management system, according to an embodiment. In addition, the partition utility command will modify the object metadata 402 to now only show the source database table 304 to have 3 partitions.

The partition utility command may not be limited to a drop partition, but can also be a merge partition, a move partition, the split partition, or a truncate partition. Drop partition removes all data, statistics, corresponding local indexes, and partition definition related to that partition. Merge partition combines the data from two or more merge-compatible partitions into a single partition. Move partition moves the data and associated indexes of one partition from one segment to a specified segment. For example, the segment denotes a logical location, within source database table 105. Split partition redistributes the data of a single partition into two or more partitions. Truncate partition removes all the data and associated indexes from that partition, but leaves the partition definition intact.

In an embodiment, an active utility node is a server instance 104.*n* that received and is currently executing a partition utility command, such as drop partition. Following the execution of a partition utility, the active utility node becomes a utility node, according to an embodiment. The utility node describes a server instance where the partition utility has executed and the server instance is waiting for a subsequent task.

As shown in FIG. 4, the utility node (server 104.*n*) received the drop partition command to execute on P4 and the source database table 304 has only three partitions P1, P2, and P3. In particular, the page-oriented files 202 updates the object metadata partitions 402 on the utility node to reflect the current state of the source database table 302 on the utility node. Object metadata, or metadata, is an in-memory structure, which stores information of an object, or a database table, currently representing the data in the database table. For example, object metadata may describe the title of the source database table 302, the labels of the columns, the number of columns, the labels of each row, the number of rows, and the number of partitions.

At this point, the object metadata partition 404 on servers 104.1 through 104.3 have stale and inconsistent metadata information in relation to the utility node 104.*n*. Next, server 104.1 receives a DML/SELECT/DDL command from client 102.1 over communications network 129.1. According to example embodiments, these commands may include but not be limited to INSERT, SELECT, DELETE, or UPDATE. Before the server 104.1 acts upon the DML command, the typical distributed database system will flush the server 104.1's object metadata and recreate the new object metadata from its source database table 304, according to an embodiment. As mentioned above, flushing refers to clearing/erasing the contents of cache 208. According to an embodiment, the cache manager 204 may flush the contents of cache 208 if the cache 208 is full and there is a need for a cache replacement. In another embodiment, the cache manager 204 may flush the cache 208 upon receipt of a query. In another embodiment, the cache manager 204 may flush the cache 208 before the recovery manager 206 commits permanent changes to the copy of the stable database storage 210 and to the stable database storage 108.

In an embodiment, the page file manager 202 may recreate the object metadata from the source database table 302. Specifically, the page file manager 202 may recreate the object metadata by reading one or more header files associated with the one or more source database tables 302 (not shown in FIG. 4). As mentioned above, the header files may contain metadata such as title of the source database table 302, the labels of the columns, the number of columns, the labels of each row, and the number of rows, to name a few. Following recreation, the object metadata is stored in cache 208 for query manipulation.

However, if the server 104.1 performs object metadata flush and recreation upon receipt of a DML command, the server 104.1 will act upon outdated information. Specifically, the server 104.1 will not have the correct object metadata in its source database table 302. Further, server 104.1 may execute the DML command on wrong or old object metadata (P4) which was changed (e.g., dropped P4) by the partition utility command, on utility node 104.*n*. Therefore, metadata across the distributed database system 100 is unsynchronized and inconsistent.

In order to maintain data consistency during concurrent DML operations across all nodes, the servers 104.1 through 104.*n* may flush and recreate the object metadata in the distributed database system 100, according to an embodiment. For example, in FIG. 4, server 104.1 may receive a partition utility command from client device 102.1 over communication networks 129.1. In an embodiment, the page file manager 202 locks access to the one or more partitions affected by the partition utility command on the copy of the stable database storage 210. The page file manager 202 releases the locks on the affected partitions for subsequent tasks once the partition utility command finishes execution, according to an embodiment.

The next node to receive a subsequent command from a client device, such as server 104.2, first flushes and recreates its object metadata in cache 208, according to an embodiment. Then, server 104.2 will receive information pertaining to the latest object metadata from the utility node (server 104.1) via the storage database storage 108, according to an embodiment. Server 104.2 receives the latest object metadata from the utility node because following the partition utility's execution, the utility node automatically pushes out the latest object metadata to the node where the server 104.2 executes the subsequent command. In an embodiment, if the utility node received the subsequent command, then the utility node transmits the signal to all other nodes to flush and recreate their respective object metadata. Then, the utility node transmits all the object metadata changes to the other nodes, according to an embodiment.

In another embodiment, the server receiving the subsequent command may request newly created object metadata from the utility node. For example, in reference to FIG. 2, server 104.1 may receive a partition utility command from client device 102.1 over communications network 129.1. The next node to receive a subsequent command from a client device, such as server 104.2, will first flush its object metadata and send a signal to all other nodes, according to an embodiment. Server 104.2 will block the subsequent command if the command plans to manipulate the affected partitions until the utility node (server 104.1) transmits the newly created object metadata, according to an embodiment. Otherwise, server 104.2 will allow the subsequent command if the command plans to manipulate the additional unlocked partitions, according, to an embodiment.

In an embodiment, the signal sent by server 104.2 instructs the utility node to recreate the new object metadata and send the new object metadata back to server 104.2 for the command to manipulate. In an embodiment, if a non-utility node receives the signal, from, server 104.2, then that non-utility node discards the signal. Otherwise, if the utility node receives the signal, the utility node flushes and recreates the object metadata on the utility node. Then, the utility node sends the recreated object metadata to server 104.2, according to an embodiment. In an embodiment, if the utility node receives the query, then the utility node flushes and recreates the utility node's object metadata for the query to manipulate. This method maintains data and object metadata consistency across all nodes during concurrent operations while decreasing high network traffic caused by the previous method.

Figure 5:
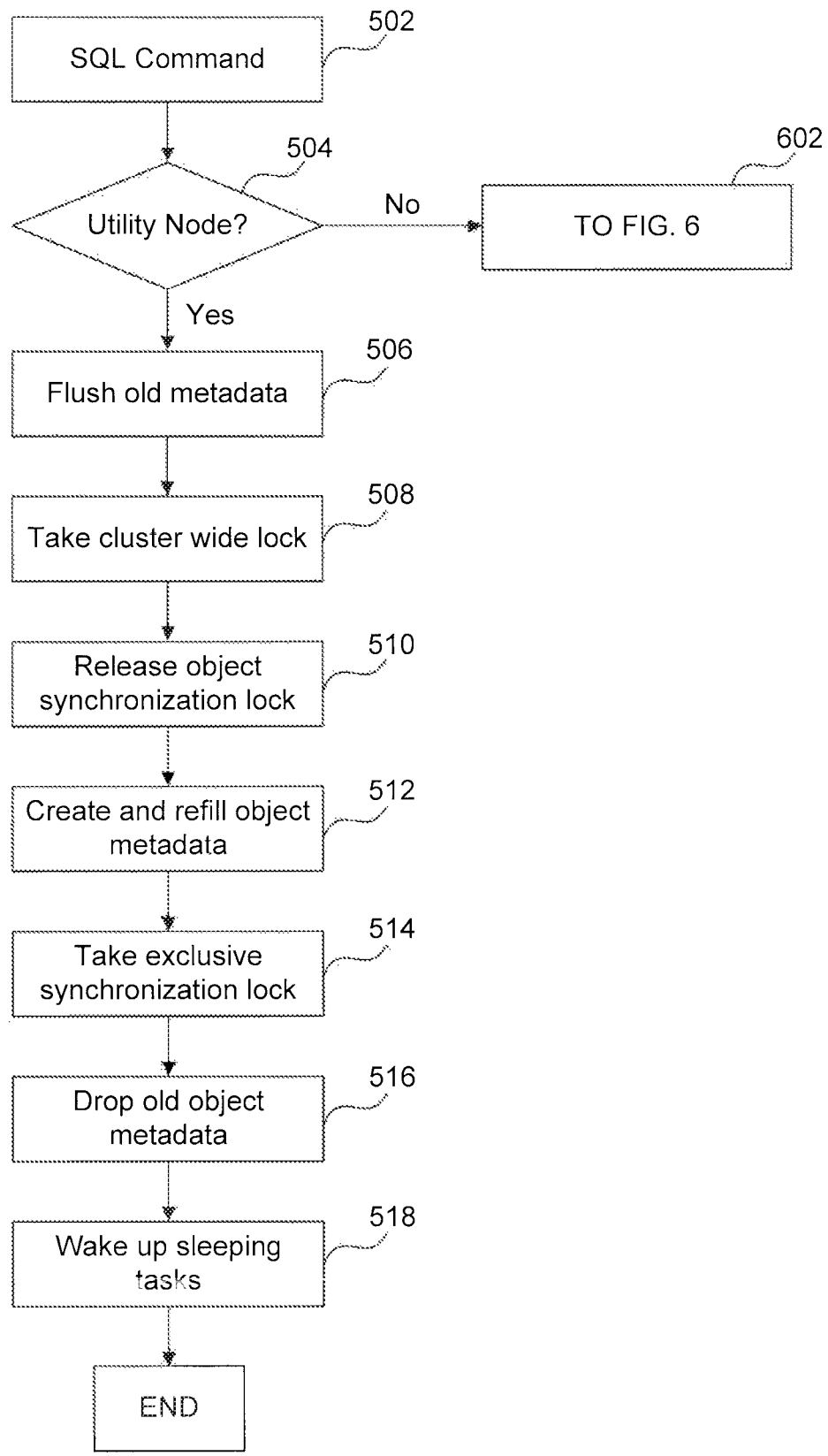
FIG. 5 is a flowchart for preventing and synchronizing an unsynchronized distributed database system, according to an example embodiment.

FIG. 5 illustrates a method for preventing data inconsistency and synchronizing an unsynchronized distributed database system, according to an embodiment. The method can be performed by processing logic that can comprise hardware (e.g., circuitry, dedicated logic, programmable logic, microcode, etc.), software (e.g., instruction executing on a processing device), or a combination thereof.

In step 502, a parser of server 104.$n$ (utility node) receives a partition utility command from a client device 102.$n$. The partition utility command may be a split partition, a merge partition, a move partition, a drop partition, or a truncate partition, according to example embodiments. In an embodiment, the parser may be, for example, parser 105 from DBMS 101 of FIG. 1. Parser 105 may check the syntax of the received partition utility command to determine a type of the partition utility command, according to an embodiment. In an embodiment, the normalizer 107 may perform semantic analysis of the partition utility to link inputs in the partition utility to specific objects within a copy of the stable database storage 108. Further, the normalizer 107 checks to see if any referential integrity constraints exist and if so, adds the constraints to the partition utility command. A referential constraint may be merging a new column relating to an employee's birthplace for every employee in the database file, according to an example embodiment.

After normalization, the compiler 109 receives a normalized partition utility command. In an embodiment, the optimizer 111 performs a cost-based analysis for formulating a plan that is reasonably close to an optimal plan for the partition utility. For example, the optimizer 111 formulates the optimal plan in order to minimize the amount of time the affected one or more partitions, which the one or more partitions the partition utility manipulates, are locked. The goal behind this solution is to ensure minimal lock time of affected partitions. Once the optimizer 111 formulates an optimal plan, the code generator 113 translates the partition utility based on the optimal plan into executable form, according to an embodiment. Then, the execution unit 115 executes the partition utility command in executable form using the access methods 117.

In an embodiment, the access methods 117 receive the partition utility command in executable form from the execution unit 115. Specifically, the access methods 115 execute the query plan, according to an embodiment. In an embodiment, the access methods 117 may call the byte access files 119 or the page-oriented access files 121 to execute the query plan. In an embodiment, page file manager 202 of page-oriented access files 127 retrieves data from the copy of the stable database storage 210 and generates metadata from the data as fixed size object files into the cache 208 called object metadata. The cache manager 204 manipulates the object metadata in the cache 208 based on the partition utility command's executable form, according to an embodiment. After manipulation, the cache manager 204 flushes the manipulated object metadata back to the copy of the stable database storage 210 while the page file manager 202 writes in the associated log file 306 information pertaining to the partition utility. Information pertaining to the partition utility may be a header containing a timestamp noting the start time and duration of the transaction and the type of transaction, according to example embodiments. The header may also contain a payload regarding redo-undo information for the query plan, according to example embodiment. This will be explained in more detail later. Lastly, the recovery manager 206 commits the changes in the copy of the stable database storage 210 to be permanent. Further, the recovery manager 206 writes the information related to partition utility's execution in the log file 306. The recovery manager 206 records the page file manager 202 releasing the locks and the completion of the partition utility in the log file 306. In an embodiment, in response to the recovery manager 206 committing the changes to the copy of the stable database storage 210, the page file manager 202 pushes the changes to the stable database storage 108 for permanent storage in the shared disks. The stable database storage 108 receives the changes in a cache 208 and permanently stores the changes to a source database table 304 on the stable database storage 108, according to an embodiment.

In an embodiment, servers 104.1 through 104.$n$ may receive a subsequent DML/SELECT/DDL command from client devices 102.1 through 102.$n$ following the server 104.$n$ receiving the partition utility command. In step 504, the server 104.$n$, which received the DML command, checks to see if the server 104.$n$ received the partition utility command. Specifically, the server 104.$n$ verifies if the server 104.$n$ is the utility node. In an embodiment, the page file manager 202 reads the log file 306 in the copy of the source database storage 210 to determine if the last transaction recorded is the partition utility command. If the answer is yes, then in step 506, the cache manager 204 in server 104.$n$ flushes the old object metadata in the cache 208 to the source database table 105.

In step 508, the page file manager 202 initiates object creation synchronization in response to receiving the DML/SELECT/DDL command, according to an embodiment. Object creation synchronization is a cluster wide lock across the distributed database system 100 on all of the affected partitions of source database table 304.$n$, according to an example embodiment. Further, object creation synchronization disallows creation of object metadata on each of the respective servers, according to an embodiment. The page file manager 202 initiates the object creation synchronization in response to receiving the DML/SELECT/DDL command in order to create new object metadata in response to partition utility modifying the source database table 302, according to an embodiment. Specifically, the page file manager 202 locks the affected partition, in response to receiving the DML/SELECT/DDL command, on the utility node so no further action may be performed except creating new object metadata, according to an embodiment. No further action may be performed by blocking any subsequent DML/SELECT/DDL command.

In step 510, the page file manager 202 initiates object access synchronization in response to receiving the command, according to an embodiment. Object access synchronization is a short duration cluster wide lock to maintain coherency of existing in-memory structures across all the nodes, according to an example embodiment. Generally, in object access synchronization, when a task on server 104.$n$ changes object metadata in the source database table 304, the page file manager 202 locks respective object metadata in the cache 208 while sending the object metadata changes to the other nodes.

In an embodiment, when a task initiates object access synchronization, the other tasks assume the latest object metadata is available on server 104.$n$. In an embodiment, the other servers 104.1 through 104.3 consult with server 104.$n$ regarding the latest object metadata under object access synchronization before allowing any modifications to their own respective object metadata. Modifications may include manipulations performed by one or more queries. In an embodiment, after the modifications are pushed to the other servers, the page file manager 202 releases the object access synchronization locks on server 104.*n*'s object metadata while sending a signal to the other servers 104.1 through 104.3 instruction to release the locks on their object metadata. Further, the page file manager 202 writes in the log file 306 that the object access synchronization locks have released and the associated time at which the locks released.

In step 512, the page file manager 202 on server 104.*n* recreates the object metadata from the newly created object metadata on the source database table 302, according to an embodiment. For example, the page file manager 202 creates the object metadata from the source database table 302 as a result of the partition utility command, such as there are three partitions now instead of four partitions as shown in FIG. 4 on server 104.*n*'s object metadata partition 402. In an embodiment, the page file manager 202 refills the object metadata with the newly created information because of the partition utility command. Further, the page file manager 202 refills the cache 208 with the newly created object metadata in server 104.*n* for fast access, according to an embodiment.

In step 514, the page file manager 202 on server 104.*n* obtains an exclusive lock on respective source database tables 302, according to an embodiment. The page file manager 202 must obtain an exclusive lock on the modified object metadata in the cache 208 before the page file manager 202 can write the object metadata to source database table 302, according to an embodiment.

In step 516, the page file manager 202 drops the old object metadata in the source database table 304 on the server 104.*n* and sends signals to all of the servers 104.1 through 104.3 to drop their respective object metadata, according to an embodiment. For example, the page file manager 202 drops the old object metadata by clearing and/or erasing the memory contents holding the old object metadata.

In step 518, the page file manager 202 unlocks each of the exclusive locks on server 104.*n*, according to an embodiment. By unlocking the exclusive lock, the page file manager 202 unblocks affected partitions in order for the sleeping tasks or subsequent tasks on the servers 104.1 through 104.*n* to manipulate the new object metadata.

If the server 104.N, in step 504, which received the DML/DDL/SELECT command verifies that the partition utility occurred on another server (such as server 104.1), then the method proceeds to step 602.

Figure 6:
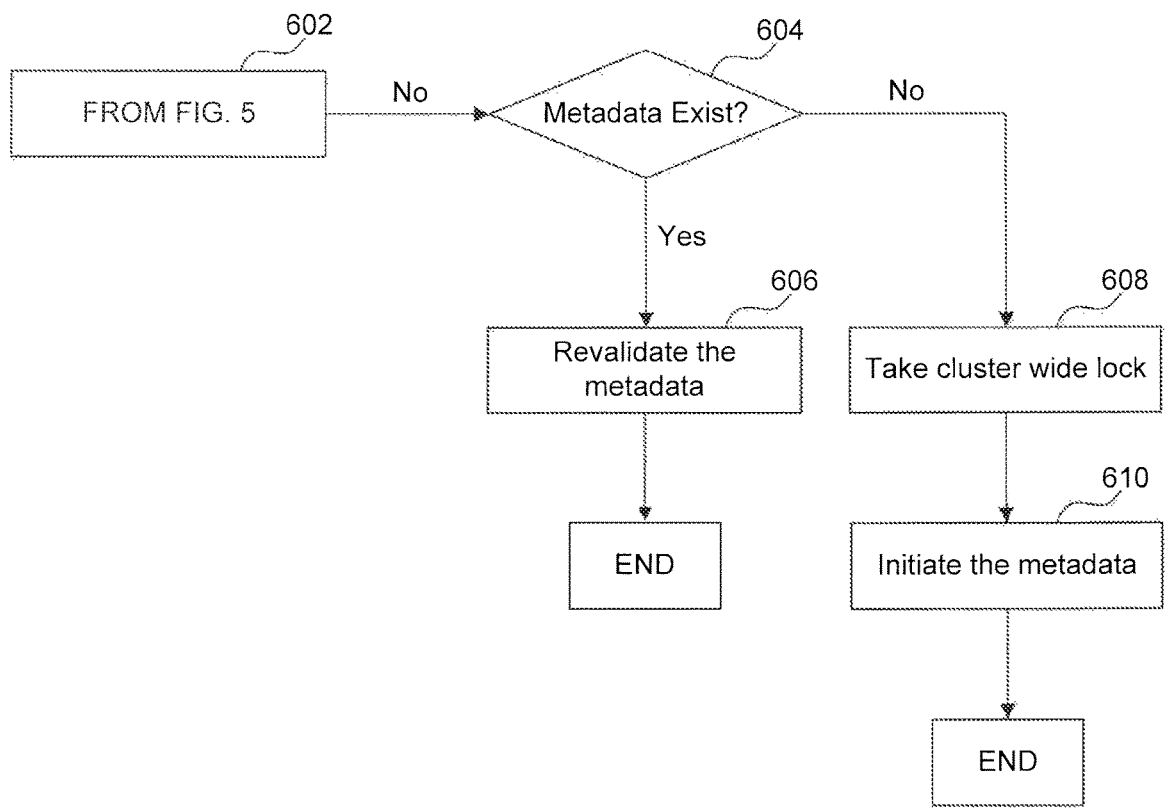
FIG. 6 is another flowchart for preventing and synchronizing an unsynchronized distributed database system, according to an example embodiment.

FIG. 6 illustrates a method for preventing data inconsistency and synchronizing an unsynchronized distributed database system, according to an embodiment. The method continues in step 602 in method 600. In step 604, the page file manager 202 on server 104.*n*, verifies if object metadata exists on the node. Specifically, the page file manager 202 accesses the cache 208 to determine if object metadata currently exists on server 104.*n*, according to an embodiment. If the page file manager 202 determines that object metadata does exist, then in step 606, the page file manager 202 performs revalidation, according to an embodiment.

The page file manager 202 performs revalidation on server 104.*n*, according to an embodiment. Revalidation is the process by which the page file manager 202 will retrieve all of the new object metadata from the utility node. Further, the page file manager 202 will store the retrieved new object metadata in the cache 208, according to an embodiment. This branch of the method skips the flushing, mechanism normally performed at a server upon receipt of a DML/DDL/SELECT command.

The distributed database system 100 runs more efficiently with less flushing functions performed. Non-utility nodes skip the flushing function because after queries manipulate object metadata in the source database table 302, the distributed database system 100 locks while the page file manager 202 flushes the manipulated object metadata. The more flushing functions performed (e.g., the more servers performing the flushing function), the longer the distributed database system is affected. Specifically, the distributed database system becomes inefficient in time and less effective when the affected partitions stay locked for long periods. Further, the larger the manipulations made to the object metadata, the longer a flushing function will occur, which locks the system for a longer period of time which in turn locks a client device from accessing the source database table until the database is unlocked. According to an embodiment, a flush operation occurs only when a subsequent task to a partition utility occurs at the utility node.

If the page file manager 202 on server 104.*n* accesses the copy of the stable database storage 210 in step 604 and determines no metadata exists, then in step 608, the page file manager 202 initiates object creation synchronization, according to an embodiment. As mentioned above, object creation synchronization disallows creation of object metadata on each of the respective servers.

In step 610, the server 104.*n* initiates the object metadata. Specifically, initiating the object metadata occurs when the server 104.*n* has no object metadata and the server 104.*n* creates the object metadata from the source database table 302, according to an embodiment. In an example embodiment, initiating the object metadata may occur the first time a new server 104.*n* boots. In another embodiment, initiating the object metadata may occur after the server 104.*n*'s source database table 302 is deleted.

According to an embodiment, the page file manager 202 reads the source database table 302 to create new object metadata. Afterwards, the server 104.*n* will have the latest object metadata. All servers in the distributed database system 100 will now have synchronized metadata and have the same copy of the distributed database. Further, any subsequent tasks to the servers 104.1 through 104.*n* following the partition utility on the utility node can occur without caring about the structure of the object metadata on the utility node.

Figure 7:
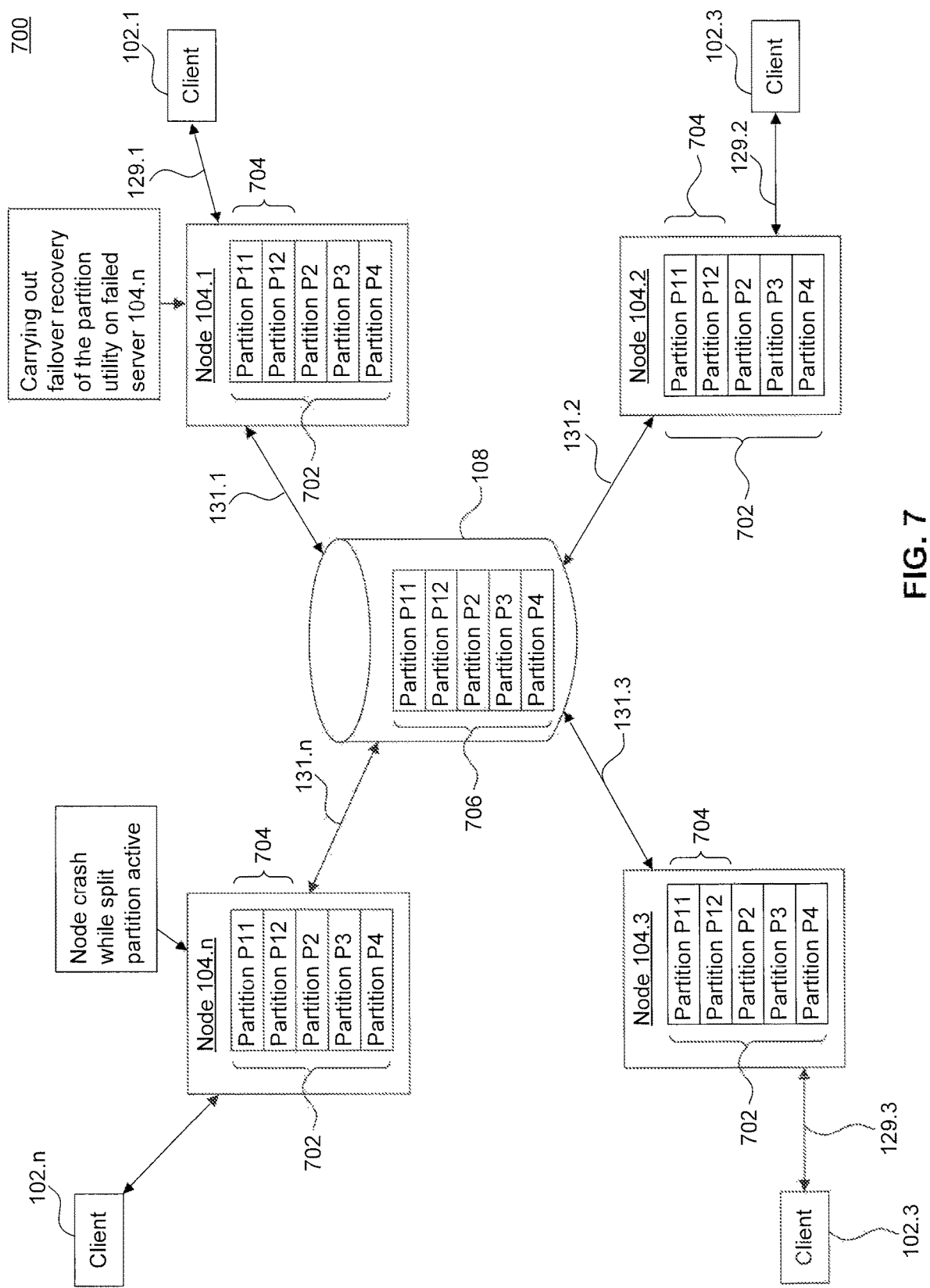
FIG. 7 is a block diagram of a distributed database system during instance failover recovery, according to an example embodiment.

FIG. 7 is a block diagram of a distributed database system during instance failover recovery, according to an example embodiment. The methods in FIGS. 5 and 6 assume the servers 104.1 through 104.*n* are online during operation of synchronization. In FIG. 7, this assumption is provoked where the utility node, crashes. According to example embodiments, the utility node may crash in two different scenarios: the utility node crashes as the active utility node (the utility node is currently executing the partition utility) or the utility node may crash after the partition utility finishes and the modifications are committed. FIG. 4 represents the first scenario, where the utility node crashes as the active utility node.

In an embodiment, server 104.*n* received a partition utility command from client device 102.*n*. For example, the server 104.*n* received a split partition command from client device 102.*n*. The split partition instructed server 104.*n*, or the active utility node, to split partition p1 into partitions p11 and p12 in the copy of the stable database storage 210, according to an embodiment. The result is shown in the object metadata partition 704. Further, the active utility node placed an exclusive lock on the partition p1 and the new partitions p11 and p12 in the copy of the stable database storage 210 while the page file manager 202 modified both partitions. Then, in the midst of executing the split partition, the active utility node crashes. The active utility node may crash because of a power outage of server 104.n; the server 104.n may receive a shutdown server command from client 102.n; or, a network outage may shut down all access to server 104.n, according to example embodiments.

Even though the active utility node crashed, the distributed database system 100 must maintain data consistency across all its servers 104.1 through 104.n. FIG. 7 shows a stage of servers 104.1 through 104.3 after a REDO pass function and before an UNDO pass function, which will be explained below. According to an embodiment, the stable database storage 108 updates its object metadata once table 104.n commits the latest changes. However, since server 104.n crashed and never committed the object metadata changes, the object metadata contents of stable database storage 108 remained unchanged.

In an embodiment, background services run on each server 104.1 through 104.n in the execution unit 115 to monitor the status of the respective servers. For example, a daemon runs in the execution unit 115 to monitor a status of the servers. Upon the active utility node crashing, the background service relays a message to each of the servers in the distributed database system 100 notifying of the crashing activity, according to an embodiment. The remaining servers, 104.1 through 104.3, implement instance failover recovery in response to the crashing activity, according to an embodiment.

Failover recovery is a process in which all-remaining servers in the distributed database system 100 (servers 104.1 through 104.3) participate in a process to recover the single crashed server (active utility node or server 104.n), according to an embodiment. In an embodiment, the remaining servers spawn a process to choose one server from the remaining servers to be responsible for executing the instance failover recovery task for the single crashed server. The chosen server proceeds to access the stable database storage 108's log file 306 for the single crashed server and retrieves lists of records that modified the source database table 302 before the crash, according to an embodiment. In an alternative embodiment, more than one servers from the remaining servers may be selected to recover the tasks on the single crashed server. The one or more servers may be chosen based on their current workload to recover the tasks on the failed server, according to example embodiments. In an embodiment, concurrent tasks are occurring on the servers 104.1 through 104.3 while the instance failover recovery process is in progress. In an embodiment, the concurrent tasks execute as long as the tasks do not interfere with the object metadata and affected partitions being recovered on the active utility node. For example, in FIG. 7, concurrent tasks may execute on partition P2, partition P3, or partition P4 shown by object metadata partitions 702 and may not execute in partition p11 and p12 shown by object metadata partitions 704 on, servers 104.1 through 104.3.

In an embodiment, after the active utility node crashed, the exclusive locks on the affected partitions are lost. Because of the crash, the exclusive locks are lost and become indoubt locks. Indoubt locks are the transition of shared and/or exclusive locks to unknown lock because of a server crash, according to an embodiment. The other servers in the distributed database system 100 will not be aware of the type of indoubt lock. The lock context information is stored in the log file 306 in each of the servers. Indoubt locks will be explained in more detail below.

In an embodiment, the page file manager 202 on the server 104.1 scans the single crashed server's log file 306. Specifically, the page file manager 202 scans the log file 306 for a log entry based on the last partition utility executed when the server crashed, according to an embodiment. In an embodiment, the last partition utility that executed when the server crashed may be the last transaction entry in the log file 306. Once the page file manager 202 finds that particular log entry, the page file manager 202 executes the REDO pass function.

In an embodiment, the failover recovery task performed by the page file manager 202 performs the REDO pass function to redo the operation of the partition utility from the single crashed server on server 104.1. The failover recovery task on server 104.1 now has performed the split partition on partition p1, resulting in partition p11 and partition p12 shown by object metadata 704. Object metadata partition 702 on servers 104.2 through 104.3 and on stable database storage 108 has no information about partition p11 and partition p12 of source database table 304, according to an embodiment.

In an embodiment, the process following the REDO pass function is the UNDO pass function. The UNDO pass function is performed to undo the operation that executed but did not commit before the server 104.N crashed. REDO and the UNDO functions are performed to maintain data consistency across all the servers and to perform similar actions across the servers, including the crashed active utility node, according to an embodiment. The crashed active utility node performs the partition utility and crashes during the partition utility. Eventually, the partition utility on the crashed active utility node will need to be undone to return the server to a working state. The same transactions need to occur on the servers 104.1, according to an embodiment.

However, a problem arises when the server 104.1 performs the UNDO pass function. Specifically, when the active utility node executed the partition utility command (the split partition command), the affected partitions were locked at the active utility node. In particular, the utility task placed a shared or an exclusive lock on the affected partitions, according to example embodiments. When the active utility node crashed, the status of the lock on the active utility node became unknown, according to an embodiment. When the failover recovery task on the server 104.1 scan the retrieved log file 306 from the crashed active utility node and finds the last partition utility command, the failover recovery task does not know how to lock the affected partitions when running the REDO pass function. Further, when the page file manager 202 executes the UNDO pass function to recover the old partition (e.g., partition p1 before the partition utility command executed on the active utility node) and deletes the newly created partitions (partition p11 and partition p12 shown by object metadata partition 704), the page file manager 202 does not have any lock protection on the affected partitions. Therefore, the UNDO pass function fails at this step because a query can access partitions p11 and p12 on servers 104.1 before the UNDO pass function can execute on the server 104.1, resulting in an error. In an embodiment, the error would display partition p1 does not exist. This breaks the ACID properties, as the isolation and consistency property of recovery task is not maintained here. ACID (Atomicity, Consistency, Isolation, and Durability) is a set of properties for a general database that provides for reliable processing of all database transactions. Specifically, the ACID property is not maintained because a transaction, such as a query, is exposed to an inconsistent state of the distributed database 100 (the state between the REDO and UNDO function of the failover recovery task). Therefore, what is needed is a consistent way to implement the instance failover recovery of partition utilities.

Figure 8:
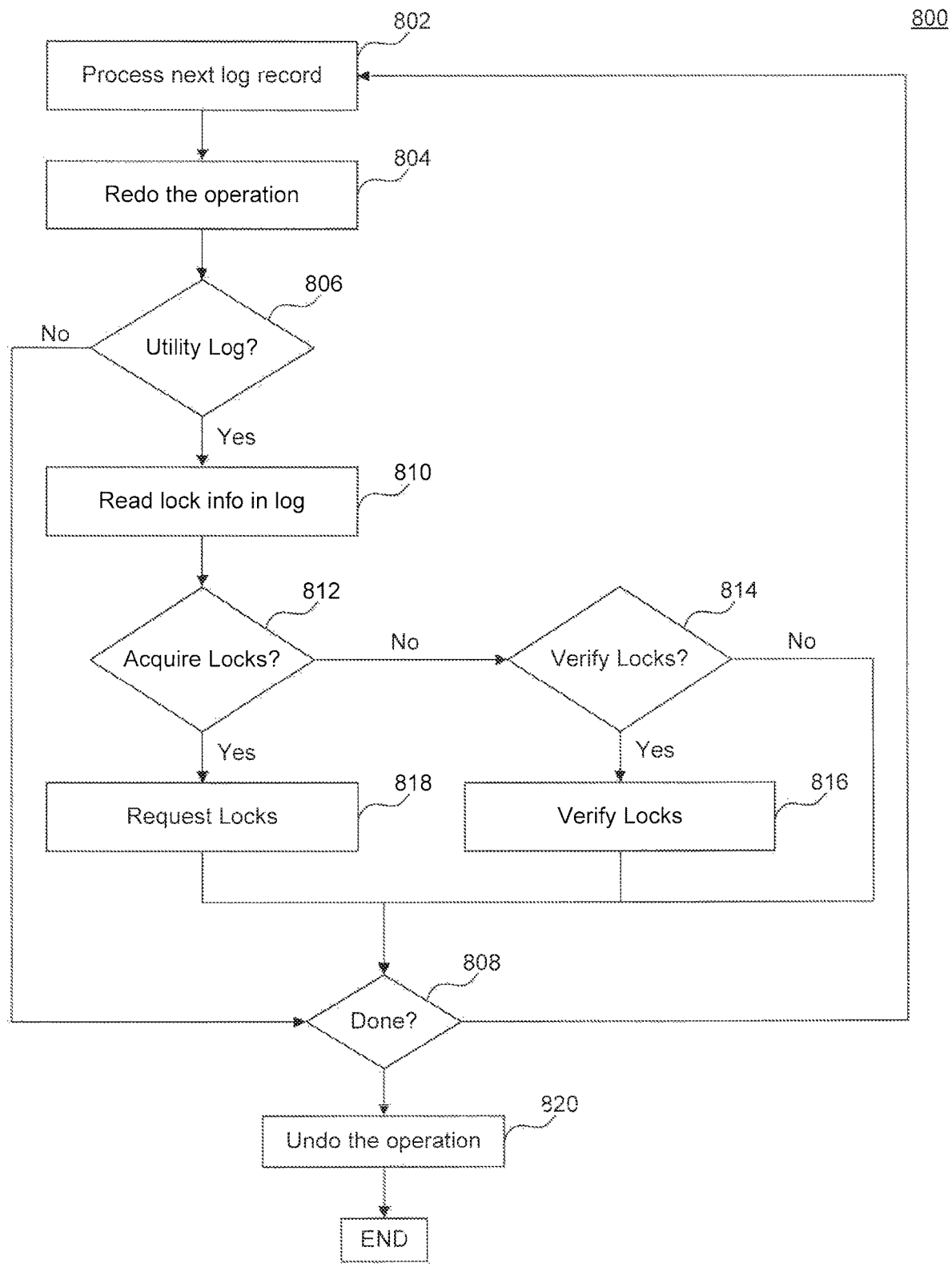
FIG. 8 is a flowchart for implementing the instance failover recovery for partition utilities in a distributed database system, according to an example embodiment.

FIG. 8 is a flowchart for a method 800 for implementing the instance failover recovery for partition utilities in a distributed database system, according to an embodiment. Method 800 can be performed by processing logic that can comprise hardware (e.g., circuitry, dedicated logic, programmable logic, microcode, etc.), software (e.g., instruction executing on a processing device), or a combination thereof.

In step 802, the current server, server 104.1 for example, processes a log file 306 from the crashed active utility node (server 104.n), according to an embodiment. Specifically, the page file manager 202 scans the log file 306 for the log entry based on the partition utility that was executing at the time the active utility node crashed.

In step 804, the current server, server 104.1, performs a REDO pass function upon finding the partition utility in the log file 306. Even though this function crashed on the active utility node, in order to maintain data consistency across the distributed database system 100, the same partition utility command (split partition from FIG. 7 on partition P1) must be performed. The REDO pass function creates partitions p11 and p12 shown in object metadata partitions 704 on server 104.1. To maintain data consistency, the same partition utility command must be undone, according to an embodiment.

In step 806, before the UNDO pass function is performed, the page file manager 202 verifies the current log file 306 is from the crashed active utility node, according to an embodiment. The page file manager 202 checks its log file 306 to determine which log records are from the crashed active utility node, according to an embodiment. For example, the page file manager 202 determines if the current log record is from the partition utility on the crashed active utility node. If the log record returns as empty then in step 508, the page file manager 202 checks for the log record in log file 306. If all the log records have been scanned then the process ends, otherwise, the page file manager 202 processes the next log record in step 802.

If the page file manager 202 determines the current log record comprises lock context information, then in step 810, the page file manager 202 gathers more information about the lock context information from the object metadata, according to an embodiment. The lock context information may comprise the types of locks taken and the identity of the locks, according to example embodiments.

It step 812, the page file manager 202 checks if there is any lock context information to re-acquire locks, according, to an embodiment. If there is no lock re-acquisition instruction found in the lock context information, then in step 814, the page file manager 202 performs a validation check that the instance failover recovery tasks has acquired the necessary locks for this log file record. In an example embodiment, the necessary locks required may be exclusive partition level locks on partitions p1, p11 and p12.

If the page file manager 202 determines the instance failover recovery tasks have no locks to verify in step 814, then in step 808, the page file manager 202 scans the next log record, according to an embodiment. Otherwise, in step 816, the page file manager 202 verifies the instance failover recovery tasks has only one type lock to not reacquire the same locks multiple times. Then in step 820, the UNDO pass function is performed which will be explained in more detail below.

In step 812, if the page file manager 202 found the lock context information in the object metadata then the locks are reacquired in step 818. For example, the lock context information may comprise the types of locks taken and the identity of the locks, according to example embodiments. Specifically, the type of locks may be shared or exclusive locks and the identity of the locks may be partition identifiers of partition p1. In an embodiment, reacquiring, the locks applies the locks to the one or more partitions that were acted upon by the partition utility. However, these locks became indoubt locks, and as such, the indoubt locks are passed to the instance failover recovery task, according to an embodiment. The indoubt locks are reacquired in step 818 because after the REDO pass function in step 808, the page file manager 202 clears and releases all of the other locks besides the one reacquired in the REDO function, according to an embodiment. Tasks received by the servers 104.1 through 104.3 can concurrently run on the other partitions without being blocked. This concurrent operation is a benefit of this system.

In step 820, the UNDO pass function is performed by the page file manager 202, according to an embodiment. For example, the UNDO pass function performs the opposite of the partition utility command, according to an embodiment. In the example shown in FIG. 7, the server 104.N executed the split partition command. Therefore, the UNDO pass function will merge partitions p11 and p12 shown in object metadata partitions 704 back to partition p1 to set the distributed database system 100 back to a state before the previous partition utility command issued, according to an embodiment. Following the UNDO pass function, the instance failover recovery task releases all the locks on the affected p1, p11, and p12 partitions, according to an embodiment. The affected partition(s) are now in a consistent state and may be accessed by other transactions without violating any inconsistent states.

In the second scenario (not illustrated by FIG. 8), the utility node may crash after the partition utility finishes and the modifications are committed, according to an embodiment. However, this case reaches a simpler conclusion than the first scenario. In an example embodiment, the other servers 104.1 through 104.3 may initiate the instance failover recovery process once the background service recognizes a crashed server. The servers each retrieve the source database table 302 and associated log file 306 from the stable database storage 108, according to an embodiment. In an embodiment, the stable database storage 108 stores a copy of the source database table 302 and associated log file 306 from every server 104.1 through 104.N upon a commit from each the servers. After the servers scan the log files 306 and find the partition utility, they will perform the REDO pass function on the partition utility, according to an embodiment. Specifically, the REDO pass function will create the new partitions p11 and p12 shown in object metadata partitions 704 out of partition p1. Further, the page file manager 202 will also notice that the log file 306 shows the partition utility has been committed to persistent storage. In an embodiment, the UNDO pass function is skipped and no locks will be acquired on partition p11 and p12 because all the servers now maintain the same data consistency. Therefore, after the REDO phase completes, the process immediately ends and the newly created partitions (p11 and p12 shown in object metadata partition 704) are open to subsequent concurrent tasks, according to an embodiment.

Figure 9:
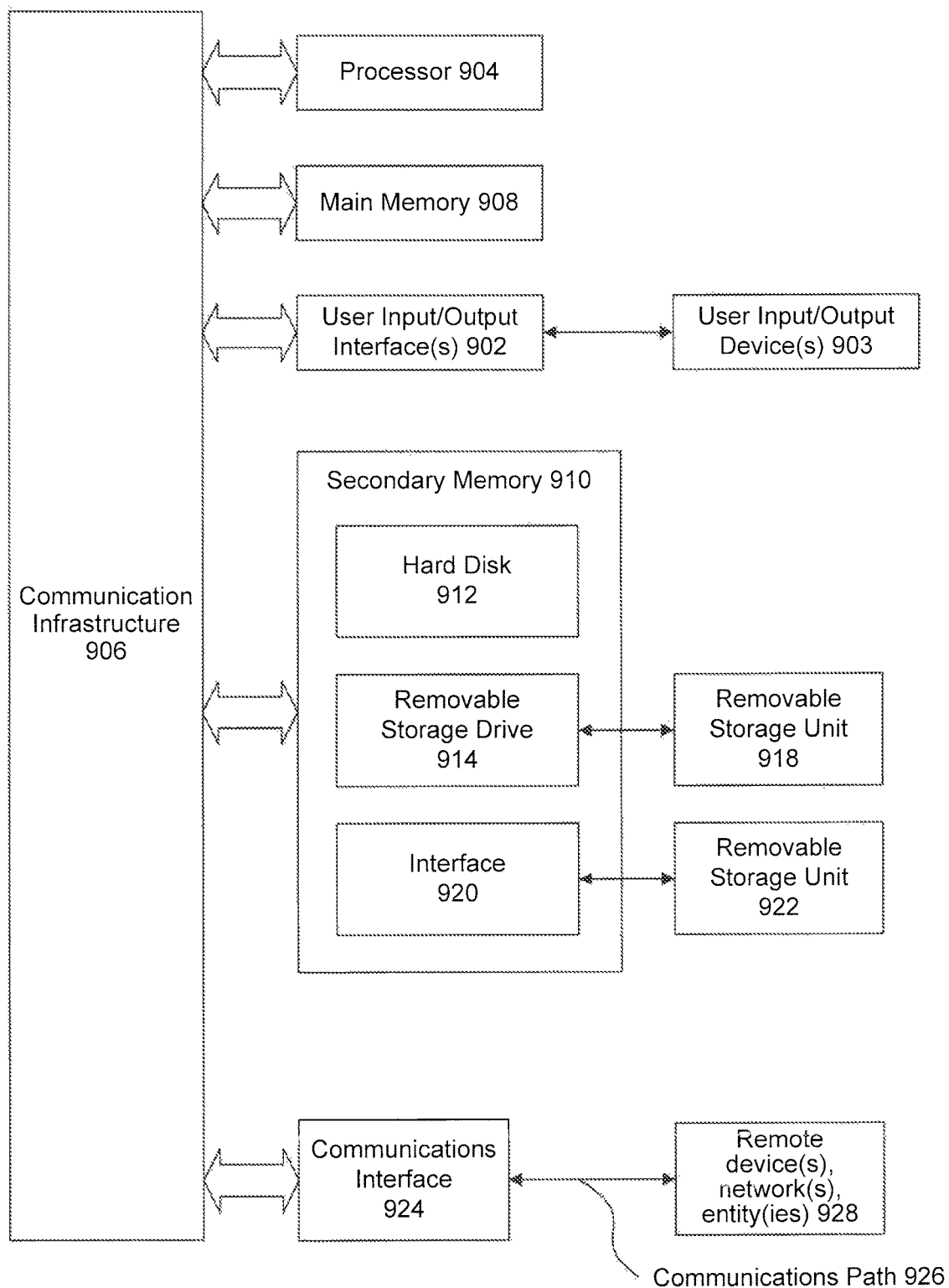
FIG. 9 depicts an example computer system useful for implementing various embodiments.

Various embodiments can be implemented, for example, using one or more well-known computer systems, such as computer system 900 shown in FIG. 9. Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical, storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication, path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but, every embodiment may not necessarily include the particular feature, structure, or characteristic. Moreover, such phrases are not necessarily referring to the same embodiment. Further, when a particular feature, structure, or characteristic is described in connection with an, embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
locking, by a second node, a partition in the second node responsive to a partition utility command executed by a utility node and affecting the partition handled by the utility node, and responsive to a query received at the second node, wherein the utility node and the second node are part of a cluster;
blocking, by the second node, the query to a data portion of the partition in the second node responsive to the partition utility command;
locking, by the second node, object metadata from the second node based on a cluster-wide lock issued responsive to the partition utility command;
receiving, by the second node, changes to object metadata of the utility node and applying the changes to the object metadata of the second node; and
unlocking, by the second node, the partition and the object metadata of the second node and unblocking the query, once the changes to the object metadata of the utility node are applied to the object metadata of the second node,
wherein at least one of the locking the partition, blocking the query, locking the object metadata from the second node, receiving the changes, and unlocking the partition are performed by one or more processors.

2. The method of claim 1, further comprising:
locking partitions in the utility node responsive to execution of the partition utility command.

3. The method of claim 1, wherein the partition utility command comprises a merge partition, a drop partition, a move partition, a split partition, or a truncate partition.

4. The method of claim 1, further comprising:
flushing data to persistent storage at the utility node and writing information pertaining to the partition utility command to a log file responsive to execution of the partition utility command.

5. The method of claim 1, wherein the cluster-wide lock comprises object creation synchronization, wherein the object creation synchronization disallows creation of the second node object metadata.

6. The method of claim 1, wherein the cluster-wide lock comprises object access synchronization, wherein the object access synchronization comprises instructions to lock in-memory structures containing the second node object metadata.

7. The method of claim 1, further comprising:
receiving, by the second node, a flush instruction on the object metadata based on a subsequent task to the partition utility command being executed by the utility node.

8. A system, comprising:
a memory; and
at least one processor coupled to the memory and configured to:
lock, by a second node, a partition in the second node responsive to a partition utility command executed by a utility node and affecting the partition handled by the utility node, and responsive to a query received at the second node, wherein the utility node and the second node are part of a cluster;
block, by the second node, the query to a data portion of the partition in the second node responsive to the partition utility command;
lock, by the second node, object metadata of the second node based on a cluster-wide lock issued responsive to the partition utility command;
receive, by the second node, changes to object metadata of the utility node and applying the changes to the object metadata of the second node; and
unlock, by the second node, the partition and the object metadata of the second node and unblock the query, once the changes to the object metadata of the utility node are applied to the object metadata of the second node.

9. The system of claim 7, wherein the at least one processor is further configured to:
lock partitions in the utility node responsive to execution of the partition utility command.

10. The system of claim 8, wherein the partition utility command comprises a merge partition, a drop partition, a move partition, a split partition, or a truncate partition.

11. The system of claim 8, wherein the at least one processor is further configured to:
flush data to persistent storage at the utility node and write information pertaining to the partition utility to a log file responsive to execution of the partition utility command.

12. The system of claim 8, wherein the cluster-wide lock comprises object creation synchronization, wherein the object creation synchronization disallows creation of the second node object metadata.

13. The system of claim 8, wherein the cluster-wide lock comprises object access synchronization, wherein the object access synchronization comprises instructions to lock in-memory structures containing the second node object metadata.

14. A non-transitory computer-readable device having instructions stored thereon that, when executed by at least one computing device, causes the at least one computing device to perform operations comprising:
locking, by a second node, a partition in the second node responsive to a partition utility command executed by a utility node and affecting the partition handled by the utility node and responsive to a query received at the second node, wherein the utility node and the second node are part of a cluster;
blocking, by the second node, the query to a data portion of the partition in the second node responsive to the partition utility command;
locking, by the second node, object metadata of the second node based on a cluster-wide lock issued responsive to the partition utility command;
receiving, by the second node, changes to object metadata of the utility node and applying the changes to the object metadata of the second node; and
unlocking, by the second node, the partition and the object metadata of the second node and unblocking the query, once the changes to the object metadata of the utility node are applied to the object metadata of the second node.

15. The computer-readable device of claim 14, the operations further comprising:
locking partitions in the utility node responsive to execution of the partition utility command.

16. The computer-readable device of claim 15, wherein the execution of the partition utility command further comprises:
writing lock context information regarding the execution of the partition utility command in a log file on the utility node;
executing failover recovery on the second node in response to a failure of the execution of the partition utility command on the utility node; and reading the lock context information from the log file and locking the partition based on the lock context information during the failover recovery.

17. The computer-readable device of claim 14, the operations further comprising:
flushing data to persistent storage at the utility node and writing information pertaining to the partition utility to a log file responsive to execution of the partition utility.

18. The computer-readable device of claim 14, wherein the cluster-wide lock comprises object creation synchronization, wherein the object creation synchronization disallows creation of the second node object metadata.

19. The computer-readable device of claim 14, wherein the cluster-wide lock comprises object access synchronization, wherein the object access synchronization comprises instructions to lock in-memory structures containing object metadata on the second node.

20. The computer-readable device of claim 14, wherein the locking the object metadata of the second node further comprises skipping flushing on the second node.

21. The computer-readable device of claim 14, wherein the changes to the object metadata of the utility node are a result of the execution of the partition utility command to the partition handled by the utility node.

\* \* \* \* \*